US008660842B2

(12) United States Patent  
Raux

(10) Patent No.: US 8,660,842 B2  
(45) Date of Patent: Feb. 25, 2014

(54) ENHANCING SPEECH RECOGNITION USING VISUAL INFORMATION

(75) Inventor: Antoine R. Raux, Cupertino, CA (US)

(73) Assignee: Honda Motor Co., Ltd., Tokyo (JP)

( * ) Notice: Subject to any disclaimer, the term of this patent is extended or adjusted under 35 U.S.C. 154(b) by 867 days.

(21) Appl. No.: 12/720,636

(22) Filed: Mar. 9, 2010

(65) Prior Publication Data

US 2011/0224979 A1 Sep. 15, 2011

(51) Int. Cl.
| | | |
|---|---|---|
| *G10L 21/02* | (2013.01) | |
| *G10L 19/14* | (2006.01) | |
| *G10L 19/00* | (2013.01) | |
| *G10L 15/06* | (2013.01) | |
| *G10L 15/26* | (2006.01) | |
| *G10L 21/00* | (2013.01) | |
| *G10L 21/06* | (2013.01) | |

(52) U.S. Cl.
USPC ........... 704/233; 704/211; 704/216; 704/217; 704/218; 704/243; 704/244; 704/226; 704/235; 704/270; 704/271; 704/275; 704/500

(58) Field of Classification Search
USPC ......... 704/211, 216, 217, 218, 233, 240, 271, 704/275, 500, 226, 243, 244, 235, 270
See application file for complete search history.

(56) References Cited

U.S. PATENT DOCUMENTS

| | | | |
|---|---|---|---|
| 4,757,541 A | 7/1988 | Beadles | |
| 4,769,845 A | 9/1988 | Nakamura | |
| 5,586,171 A | 12/1996 | McAllister et al. | |
| 5,696,878 A | 12/1997 | Ono et al. | |
| 6,185,529 B1 | 2/2001 | Chen et al. | |
| 6,236,963 B1 | 5/2001 | Naito et al. | |
| 6,327,565 B1 | 12/2001 | Kuhn et al. | |
| 6,567,775 B1 * | 5/2003 | Maali et al. | .................... 704/231 |
| 6,577,333 B2 * | 6/2003 | Tai et al. | .................... 348/14.08 |
| 6,754,373 B1 * | 6/2004 | de Cuetos et al. | ............. 382/118 |
| 6,816,836 B2 | 11/2004 | Basu et al. | |
| 6,823,305 B2 | 11/2004 | Eide | |
| 6,876,966 B1 * | 4/2005 | Deng et al. | .................... 704/233 |
| 6,941,264 B2 | 9/2005 | Konopka et al. | |
| 6,950,796 B2 * | 9/2005 | Ma et al. | ........................ 704/244 |
| 6,959,276 B2 * | 10/2005 | Droppo et al. | ................. 704/226 |
| 7,257,532 B2 * | 8/2007 | Toyama | ......................... 704/243 |
| 7,392,188 B2 * | 6/2008 | Junkawitsch et al. | .......... 704/251 |
| 7,424,426 B2 * | 9/2008 | Furui et al. | ..................... 704/250 |
| 2003/0018475 A1 | 1/2003 | Basu et al. | |
| 2004/0111258 A1 * | 6/2004 | Zangi et al. | .................... 704/226 |

(Continued)

OTHER PUBLICATIONS

B. Chen, M. Meguro, and M. Kaneko. "Probabilistic Integration of Audiovisual Information to Localize Sound Source in Human-Robot Interaction". Proceedings of the 2003 International Workshop on Robot and Human Interactive Communication, 2003.*

(Continued)

*Primary Examiner* — Edgar Guerra-Erazo
(74) *Attorney, Agent, or Firm* — Fenwick & West LLP; Mark E. Duell

(57) ABSTRACT

Speech recognition device uses visual information to narrow down the range of likely adaptation parameters even before a speaker makes an utterance. Images of the speaker and/or the environment are collected using an image capturing device, and then processed to extract biometric features and environmental features. The extracted features and environmental features are then used to estimate adaptation parameters. A voice sample may also be collected to refine the adaptation parameters for more accurate speech recognition.

24 Claims, 7 Drawing Sheets

(56) References Cited

U.S. PATENT DOCUMENTS

| | | | |
|---|---|---|---|
| 2004/0138882 A1* | 7/2004 | Miyazawa | 704/233 |
| 2004/0230420 A1* | 11/2004 | Kadambe et al. | 704/205 |
| 2005/0187763 A1* | 8/2005 | Arun | 704/226 |
| 2007/0038442 A1* | 2/2007 | Visser et al. | 704/233 |
| 2007/0038448 A1* | 2/2007 | Sherony | 704/240 |
| 2009/0012786 A1* | 1/2009 | Zhang et al. | 704/233 |
| 2009/0106021 A1* | 4/2009 | Zurek et al. | 704/226 |
| 2009/0271188 A1* | 10/2009 | Agapi et al. | 704/233 |
| 2010/0004931 A1* | 1/2010 | Ma et al. | 704/244 |
| 2010/0204988 A1* | 8/2010 | Xu et al. | 704/233 |
| 2011/0015925 A1* | 1/2011 | Xu et al. | 704/233 |
| 2012/0106758 A1* | 5/2012 | Bonada et al. | 381/94.3 |

OTHER PUBLICATIONS

I. Hara et al., "Robust speech interface based on audio and video information fusion for humanoid HRP-2," IROS-2004. pp. 2404-2410.*

Erzin, E.; Yemez, Y.; Tekalp, A.M.; Ercil, A.; Erdogan, H.; Abut, H.; , "Multimodal person recognition for human-vehicle interaction," MultiMedia, IEEE , vol. 13, No. 2, pp. 18-31, Apr.-Jun. 2006.*

Alissali, M. et al., "Asynchronous Integration of Visual Information in an Automatic Speech Recognition System," IEEE, 1996, vol. 1, pp. 34-37.

Bilmes, J., "A Gentle Tutorial of the EM Algorithm and its Application to Parameter Estimation for Gaussian Mixture and Hidden Markov Models," International Computer Science Institute, 1998, 15 pages.

Brooke, M., "Using the Visual Component in Automatic Speech Recognition," Proceedings of the International Conference of Spoken Languages, 1996, vol. 3, pp. 1656-1659.

Chesta, C. et al., "Maximum a Posteriori Linear Regression for Hidden Markov Model Adaptation," 6th European Conference on Speech Communication and Technology, Sep. 5-9, 1999, pp. 211-214, Budapest, Hungary.

Cohen, J. et al., "Vocal Tract Normalization in Speech Recognition: Compensating for Systematic Speaker Variability," Journal of the Acoustical Society of America, 129$^{th}$ Meeting of the Acoustical Society of America, May 1995, vol. 97, No. 5, Pt. 2, pp. 3246-3247.

Duchnowski, P. et al., "See Me, Hear Me: Integrating Automatic Speech Recognitionand Lip-Reading," Proceedings of the International Conference of Spoken Languages, 1994, 4 pages.

Durrant-Whyte, H. et al., "Simultaneous Localization and Mapping," IEEE Robotics and Automation Magazine, Jun. 2006, pp. 99-108.

Eide, E. et al., "A Parametric Approach to Vocal-Tract-Length Normalization," Speech Research Symposium, Jun. 12-14, 1995, pp. 161-167, Baltimore, Maryland, USA.

Eide, E. et al., "A Parametric Approach to Vocal Tract Length Normalization," IEEE, 1996, pp. 346-348.

Gales, M.J.F. et al., "Mean and Variance Adaptation within the MLLR Framework," Cambridge University Engineering Dept., 1996, 27 pages, Cambridge, England.

Gauvain, J.L. et al., Maximum a Posteriori Estimation for Multivariate Gaussian Mixture Observations of Markov Chains, IEEE Trans. on Speech and Audio, Apr. 1994, 16 pages.

Gauvain, J.L. et al.,"Bayesian Learning of Gaussian Mixture Densities for Hidden Markov Models," Proceedings of DARPA Speech and Natural Language Workshop, 1991, pp. 272-277, Palo Alto, California, USA.

Gomez, R. et al., "Robust Speech Recognition in Reverberant Environment by Optimizing Multi-band Spectral Subtraction," *Journal of the Spoken Language Processing SIG of the Information Processing Society of Japan*, 2009, 6 pages, Kyoto, Japan.

Gomez, R. et al., "Speech Enhancement Optimization Based on Acoustic Model Likelihood for Noisy and Reverberant Enbironment," Japanese Society for Artificial Intelligence, JSAI Technical Report, SIG-Challenge-A902-9, pp. 45-49.

Gordon, M. et al., "A Support Vector Machine-Based Dynamic Network for Visual Speech Recognition Applications," EURASIP Journal of Applied Signal Processing, 2002, vol. 11, pp. 1248-1259, Hindawi Publishing Corporation.

Huang, X.D. et al., "Spoken Language Processing—A Guide to Theory, Algorithm and System Development: Hidden Markov Models," 2001, Part III, Chapter 8, pp. 375-475, Prentice Hall, New Jersey.

Iseli, M. et al., "Age-and Gender-Dependent Analysis of Voice Source Characteristics," IEEE, 2006, pp. I-389 to I-392.

Leggetter, C.J. et al., "Maximum Likelihood Linear Regression for Speaker Adaptation of Continuous Density Hidden Markov Models," Computer Speech and Language, 1995, vol. 9, pp. 171-185.

Lei, X. et al., "Robust Feature Space Adaptation for Telephony Speech Recognition," 2006, 4 pages.

Lu, Xiaoguan et al.,"Multimodal Facial Gender and Ethnicity Identification," Advances in Biometrics, 2005, vol. 3832, pp. 554-561.

Sheill, D. et al., "An Automated System for Visual Biometrics," 45$^{th}$ Annual Allerton Conference, Sep. 26-28, 2007, pp. 869-876, Illinois, USA.

U.S. Appl. No. 11/869,435, filed Oct. 9, 2007.

Zhan, P. et al., "Vocal Tract Length Normalization for Large Vocabulary Continuous Speech Recognition," School of Computer Science, Carnegie Mellon University, May 1997, 20 pages, Pennsylvania, USA.

* cited by examiner

ENHANCING SPEECH RECOGNITION USING VISUAL INFORMATION

FIELD OF THE INVENTION

This disclosure is related to speech recognition using acoustic models, more specifically to estimating and applying speech recognition parameters to adapt speech recognition to a speaker or environment where the speech recognition is performed.

BACKGROUND OF THE INVENTION

Speech recognition is the process of converting an acoustic signal to speech elements (e.g., phones, words and sentences). Speech recognition has found application in various areas ranging from telephony to vehicle navigation. In a speech recognition system, the audio signal is collected by input devices (e.g., a microphone), converted to a digital signal, and then processed using one or more algorithms to output speech elements contained in the audio signal. Depending on the field of application, the recognized speech elements can be the final results of speech recognition or intermediate information used for further processing.

Some speech recognition algorithms use acoustic models that statistically represent sounds corresponding to each speech element. The acoustic models may be created, for example, by correlating (also known as "compiling" or "acoustic model training") audio samples of speech and corresponding text scripts. To improve the accuracy of recognition, a language model or a grammar file may be used to constrain the words to be recognized.

During speech recognition, the acoustic models may be adapted to increase the accuracy of the speech recognition. Especially when there are significant mismatches between the training conditions and conditions under which speed recognition is performed, acoustic model adaptation may increase the accuracy of speech recognition considerably. Techniques for adapting the acoustic models include, for example, maximum likelihood linear regression (MLLR), and maximum a posteriori (MAP), maximum likelihood linear regression (MLLR), maximum likelihood a posteriori linear regression (MAPLR) and Eigenvoices. Additionally, methods for normalizing the acoustic features before matching them to the acoustic models have been developed. Such methods include feature space maximum likelihood linear regression (fMLLR), feature space maximum a posteriori linear regression (fMAPLR), and vocal tract length normalization (VTLN)

SUMMARY OF THE INVENTION

Embodiments provide a method, a system and a computer readable storage medium for adapting an audio signal to an environment based on visual information. Speech recognition may be performed on speakers with different vocal characteristics and in different environments where acoustic signals exhibit different noise or reverberation characteristics. Environmental features (e.g., size of a room) are extracted by processing one or more images. An environment adaptation parameter for performing dereverberation or noise cancellation processing of an audio signal is estimated from the environmental features and applied to the audio signal. The estimated environment adaptation parameter may be available even before any audio signal is received. Hence, the dereverberation or noise cancelling of the audio signal may be performed promptly after receiving the audio signal. Speech elements (e.g., phonemes) are obtained based on the processed audio signal.

In one embodiment, biometric adaptation parameters for adapting the speech recognition to a specific speaker are also extracted from visual information. The biometric features (e.g., gender) of the speaker are extracted by processing a captured image including the speaker. A biometric adaptation parameter is determined based on the extracted biometric features. Adaptation of the speech recognition for the specific speaker is performed based on the speaker's biometric adaptation parameter.

In one embodiment, the biometric adaptation parameter is a vector representing a probability distribution of a warping factor for frequency warping the processed audio signal.

In one embodiment, the speaker's class is estimated based on the biometric features. The biometric adaptation parameter is estimated by taking the estimated class into account.

In one embodiment, the environment parameter or the biometric adaptation parameter is updated responsive to receiving a voice sample.

In one embodiment, correlation between the biometric features and the biometric adaptation parameter is identified during training by analyzing audio samples from speakers with known biometric features. Similarly, correlation between environmental features and the environment adaptation parameter is identified during training by analyzing audio samples collected from environment with known environmental features. The correlation is stored and made available for the speech recognition.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of this disclosure can be readily understood by considering the following detailed description in conjunction with the accompanying drawings.

DETAILED DESCRIPTION OF THE INVENTION

Figure 1:
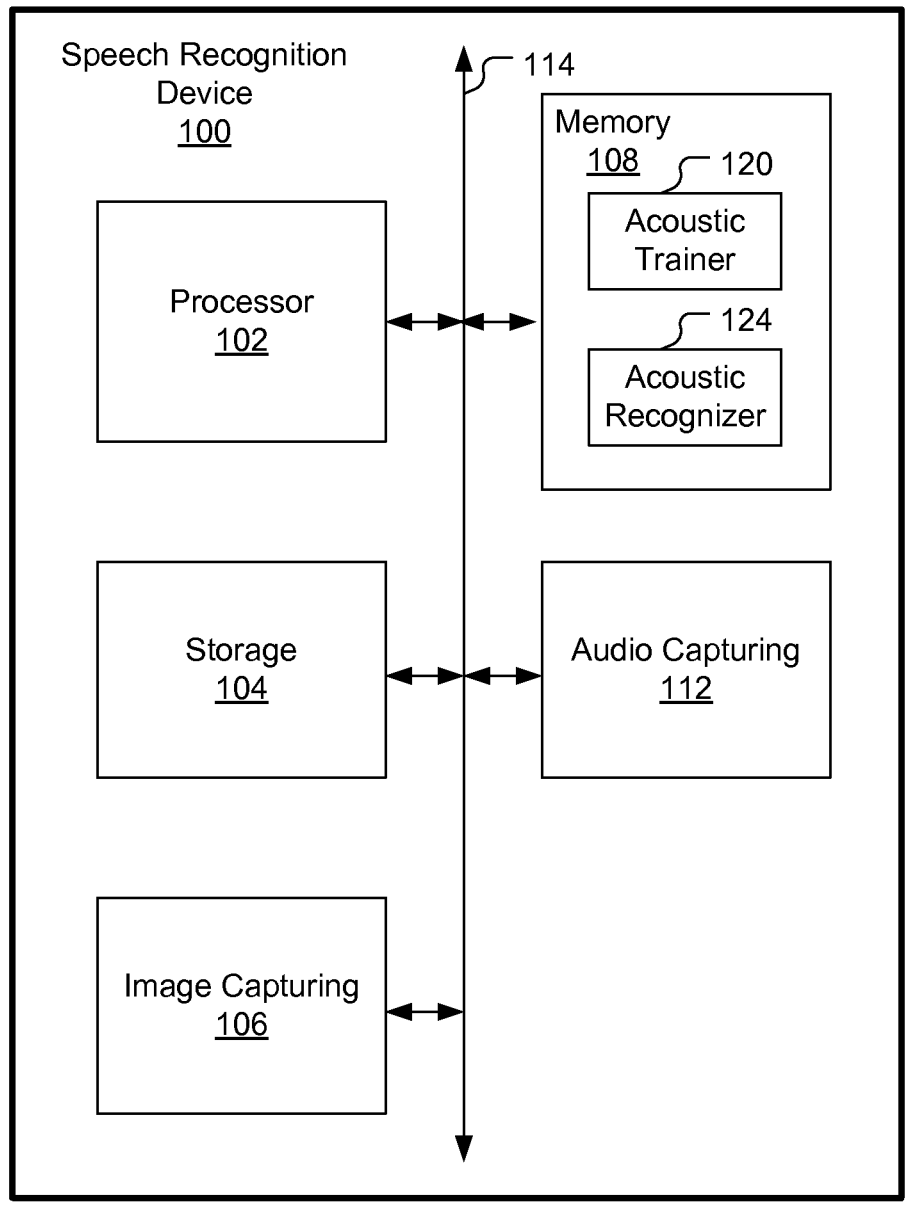
FIG. 1 is a block diagram illustrating a speech recognition device, according to one embodiment of the present invention.

A preferred embodiment of the present invention is now described with reference to the figures where like reference numbers indicate identical or functionally similar elements.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

Embodiments of the present invention estimate adaptation parameters for speech recognition even before a speaker makes an utterance. Images of the speaker and/or the environment are collected using an image capturing device, and then processed to extract biometric features and environmental features. The extracted biometric features and environmental features are then used to estimate adaptation parameters. A voice sample may also be collected to refine the adaptation parameters for more accurate speech recognition. In this way, the adaptation parameters converge to correct values faster compared to conventional techniques. Embodiments of the present invention are also compatible with various types of conventional speech recognition algorithms, obviating the need for extensive modification to the conventional speech recognition algorithms.

An environmental feature represents characteristics of a surrounding environment that are extracted from an image. The environmental feature affects reverberation of an acoustic signal generated in the environment. The environmental features include, for example, the size of an enclosed area (e.g., room), the configuration of the enclosed area, the location within the enclosed area where the speaker is located, the location within the enclosed area where a microphone is located. The environmental features may also be related to outdoor noise conditions such as noises generated by traffic, trains and wind.

An environment adaptation parameter represents a parameter associated with dereverberation or noise cancellation of the acoustic signal originating within the environment. Representative environment adaptation parameters may include Spectral Subtraction (SS) parameters, room response model parameters, and filter parameters.

A speech element refers to a component of recognized speech. The speech element may include, but is not limited to, a phoneme, a word and a sentence.

A biometric feature represents a biometric characteristic of a certain person extracted from an image. The biometric feature may include, but is not limited to, age, gender, ethnicity, weight and height of a person.

A biometric adaptation parameter represents a parameter for adapting speech recognition to a certain person. Representative biometric adaptation parameters may include, among others, a warping factor used in Vocal Tract Length Normalization (VTLN), adaptation matrices for Maximum Likelihood Linear Regression (MLLR) and eigenvoices.

A speaker described herein refers to a person making an utterance for speech recognition.

Overview of Device Architecture

In applications that interact with many speakers, conventional speech recognition devices require a large number of voice samples to adapt the speech recognition device to a certain speaker and certain environment. However, many users will feel frustrated and abandon further attempts to use the speech recognition device if the speech recognition continues to fail after a couple of tries. The speech recognition device 100 according to embodiments of the present invention is capable of performing prompt adaptation based on a small number of voice samples.

FIG. 1 is a block diagram illustrating a speech recognition device 100, according to one embodiment of the present invention. The speech recognition device 100 may be a stand-alone device for outputting phonemes, words or sentences corresponding to a speaker's utterances. The recognized phonemes, words or sentences may be displayed on a screen or output via other output devices. Alternatively, the speech recognition device 100 may be part of a larger system such as a robot, a vehicle navigation system, a personal computing device, and a kiosk. In these systems, the output from the speech recognition device 100 may be further processed to perform certain operations. For example, the output from the speech recognition device 100 may function as commands or instructions to operate a robot, a vehicle navigation system or a kiosk.

The speech recognition device 100 may be a device dedicated to speech recognition. Alternatively, the speech recognition device 100 may be a general purpose computer capable of performing speech recognition along with other operations. In one embodiment, one or more components of the speech recognition device 100 are distributed in multiple hardware devices.

In one embodiment, the speech recognition device 100 includes, among other components, a processor 102, a storage module 104, an image capturing module 106, memory 108, an audio capturing module 112 and a bus 114 connecting these components. The speech recognition device 100 may also include components not illustrated in FIG. 1 such as communication interfaces, display devices (e.g., monitor) and input devices (e.g., mouse and keyboard).

The processor 102 executes a series of instructions to perform, among other operations, training and speech recognition. The instructions may be stored in the memory 108 or the storage module 104. The processor 102 may be a general-purpose microprocessor, a digital signal processor, a graphics processing unit or other computing components capable of performing computational operations. Although only a single processor 102 is illustrated in FIG. 1, two or more processors may be included in the speech recognition device 100 to perform the same operations or distinct operations.

In one embodiment, the storage module 104 is a non-volatile computer-readable storage medium such as ROM, flash memory, hard disk or optical disk. Although illustrated in FIG. 1 as a separate component, the storage module 104 may be incorporated into the processor 102. Further, the storage module 104 may be integrated with the memory 108.

The image capturing module 106 is hardware, firmware, software or a combination thereof for capturing images. The image capturing module 106 may include, for example, one or more cameras, a buffer, and a pre-processing module. In one embodiment, one or more cameras of the image capturing module 106 detect a distance to an object in their fields of view. For this purpose, the cameras may include time-of-flight sensors or images captured by the cameras are processed by an algorithm to detect a distance based on stereoscopic view processing. The buffer temporally stores the images captured by the cameras for processing. The pre-processing module performs various signal processing (e.g., noise reduction) to enhance the quality of captured images, as well known in the art.

The memory 108 may be a computer-readable storage medium that stores instructions for the processor 102 and computational results generated by the processor 102. The memory 108 may store multiple instruction modules (i.e., software modules) including, among others, acoustic trainer 120 and acoustic recognizer 124. The acoustic trainer 120 generates basis information that can be used by the acoustic recognizer 124 for speech recognition, as described below in detail with reference to FIG. 4. The acoustic recognizer 124 performs adaptation based on the visual information received from the image capturing module 106 and speech recognition, as described below in detail with reference to FIGS. 6 and 7.

Although the acoustic trainer 120 and the acoustic recognizer 124 are illustrated in FIG. 1 as separate modules, these modules can be integrated into a single instruction module. Further, the acoustic trainer 120 and the acoustic recognizer 124 may be stored separately on different memory modules or different hardware devices. In one embodiment, the acoustic trainer 120 and the acoustic recognizer 124 are embodied on separate hardware devices. In this embodiment, the information generated by the acoustic trainer 120 is sent to the acoustic recognizer 124 via a communication network or via a computer-readable storage medium.

The audio capturing unit 112 is hardware, firmware, software or a combination thereof for converting an analog acoustic signal to a digital signal, as well known in the art. The digital signal is fed to the acoustic recognizer 124 to recognize phonemes, words or sentences included in the digital signal. In one embodiment, the audio capturing unit 112 includes one or more microphones, an analog-to-digital converter and a digital signal processing unit. The digital signal processing unit may perform operations to remove noise and preprocess the signal for speech recognition, as well known in the art.

Overview of Process at Speech Recognition Device

Figure 2:
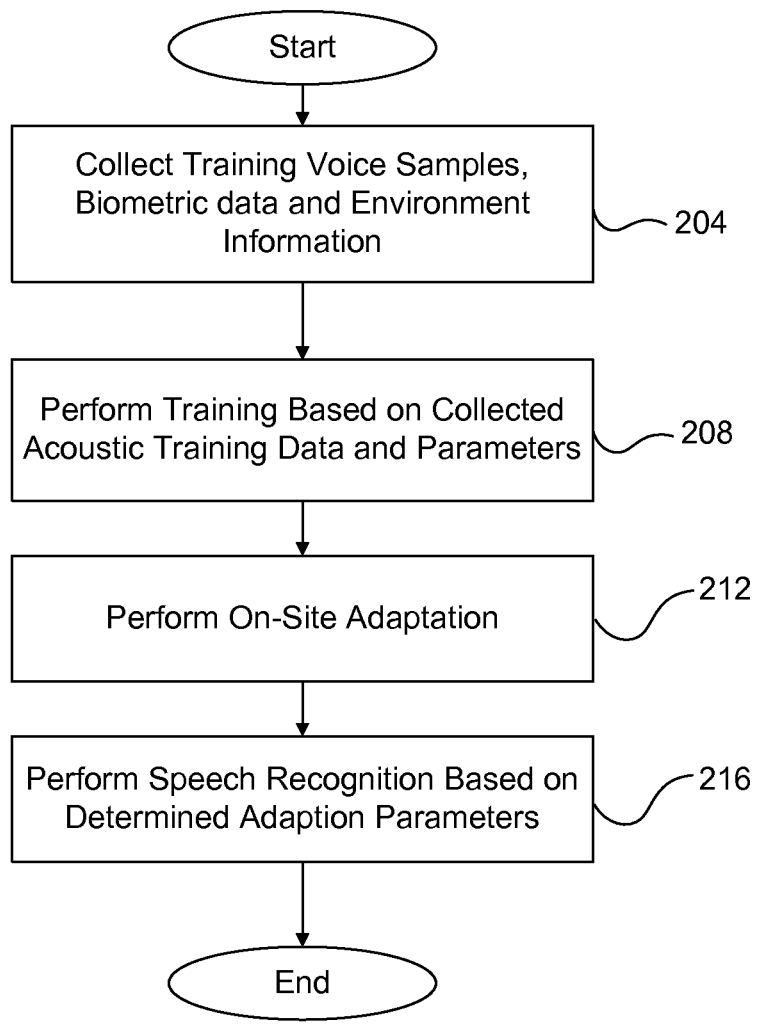
FIG. 2 is a flowchart illustrating the overall process at the speech recognition device of FIG. 1, according to one embodiment of the present invention.

FIG. 2 is a flowchart illustrating the overall process at the speech recognition device 100 of FIG. 1, according to one embodiment of the present invention. First, training voice samples are collected 204 at the speech recognition device 100. The training voice samples may be in the form of pre-compiled data that include scripted utterance of speakers such as OGI Kids' Speech Corpus available from OGI School of Science and Engineering at OHSU of Oregon, USA. The following information is also collected and/or stored at the speech recognition device 100: (i) biometric data of the speakers of the training voice samples, and (ii) environment information of the environment where the training voice samples were generated. In another embodiment, the scripted utterances and biometric data are captured and processed on-site by the audio capturing module 112.

In one embodiment, the biometric data are determined or estimated from visual information captured by the speech recognition device 100. The biometric data may include, but are not limited to, height, gender, weight, age, and ethnicity of a speaker. Such biometric data are correlated with the vocal characteristics of speakers and may be used by the acoustic trainer 120 to generate biometric adaptation parameters for a class of speakers with similar traits. The biometric adaptation parameters are retrieved by the acoustic recognizer 124 to perform on-site adaptation, as described below in detail with reference to FIG. 6.

In one embodiment, environment information includes various characteristics that affect reverberation of the speaker's utterances. In one embodiment, the environment information may include, but are not limited to, the size of an enclosed area (e.g., room) in which the audio capturing module 112 (e.g., microphone) is placed, the geometric configuration of the enclosed area, the relative location of the audio capturing module 112 within the enclosed area, and the location of the speaker within the enclosed area. In another embodiment, the environment information includes parameters associated with outdoor environment such as presence of specific noise sources (e.g., cars or trains) and the reverberation characteristics of the environment (e.g., a yard surrounded by concrete walls as opposed to an open field).

After the training voice samples and other information are collected, the speech recognition device 100 performs 208 training, as described below in detail with reference to FIG. 4. As a result of the training, the speech recognition device 100 generates generic acoustic models 340 and adaptation parameters 326, 334. The generic acoustic models 340 are applicable to all speakers whereas the adaptation parameters 326, 334 are applicable to a class of speakers or certain environment configuration.

Based on the training, the speech recognition device 100 performs 212 on-site adaptation of the speech recognition device 100. The on-site adaptation refers to the process of determining one or more adaptation parameters for a specific speaker and specific environment based on visual information. A short voice sample of the speaker may also be provided during the on-site adaptation to enhance the accuracy and/or speed of the on-site adaptation process, as described below in detail with reference to FIG. 6.

After the on-site adaptation is finished, the determined adaptation parameters are used for performing 216 speech recognition, as described below in detail with reference to FIG. 7. Specifically, the adaptation parameters function to describe how the audio signals and/or the generic acoustic models should be adjusted to enhance the speech recognition. In one embodiment, the on-site adaptation may be performed continuously during speech recognition to improve the accuracy of speech recognition.

Example Acoustic Trainer

The acoustic trainer 120 generates basis information for performing speech recognition by the acoustic recognizer 124. The basis information may include, among other information, generic acoustic models 340, environment adaptation parameters 334, and biometric adaptation parameters 326. The environment adaptation parameter 334 and the biometric adaptation parameters 326 are correlated with features 324, 364 extracted from visual information.

Figure 3:
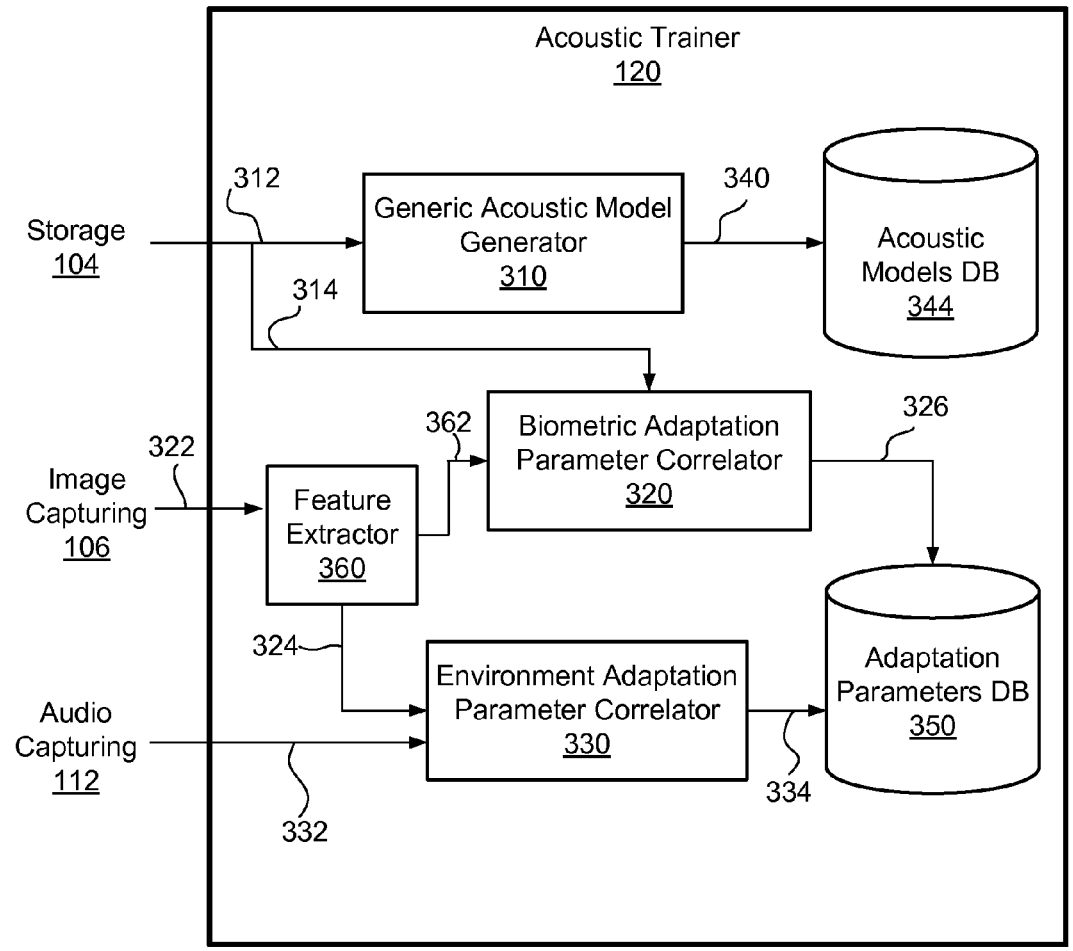
FIG. 3 is a block diagram illustrating an acoustic trainer according to one embodiment of the present invention.

FIG. 3 is a block diagram illustrating the acoustic trainer 120 according to one embodiment of the present invention. The acoustic trainer 120 may include, among other components, a generic acoustic model generator 310, a biometric adaptation parameter correlator 320, an environment adaptation parameter correlator 330, an acoustic models database 344 and an adaptation parameters database 350. The acoustic trainer 120 illustrated in FIG. 3 is merely illustrative. Components may be included in the acoustic trainer 120 or omitted from the acoustic trainer 120 based on practical considerations such as available computational/storage resources and demanded requirements (e.g., speed and accuracy) of speech recognition.

In one embodiment, the generic acoustic model generator 310 receives a set 312 of voice samples and corresponding text scripts from the storage module 104. The generic acoustic module generator 310 then maps phonemes, words or sentences in the voice samples 312 with the received text scripts to generate the generic acoustic models 340. A method for generating the acoustic models 340 is described, for example, in Blimes, J., "A gentle tutorial of the EM algorithm and its application to parameter estimation for Gaussian mixture and Hidden Markov Models." Berkeley, U.C. (ed.), International Computer Science Institute (ICSI) and Computer Science Division, Department of Electrical Engineering and Computer Science (1998).

In one embodiment, the feature extractor 360 receives images 322 captured by the image capturing module 106 and extracts biometric features 362 and environmental features 324. The biometric features 362 are correlated with biometric adaptation parameters, and hence, the biometric features 362 can be used for estimating the biometric adaptation parameters. A biometric feature, for example, may indicate the speaker's height derived from speaker's head location in the captured images. In one embodiment, the biometric adaptation parameters are estimated based on a speaker's pose determined using, for example, techniques described in U.S. patent application Ser. No. 11/869,435, entitled "Human Pose Estimation and Tracking Using Label Assignment," filed on Oct. 9, 2007, which is incorporated by reference herein in its entirety.

Another biometric feature may be the speaker's skin tone that allows estimation of the speaker's ethnicity. Facial features may also be extracted and analyzed by the feature extractor 360 to determine, for example, the speaker's age, gender, weight and ethnicity. In one embodiment, speaker's gender, ethnicity, weight and age are identified, for example, using techniques described in Xiaoguan Lu et al., "Multimodal Facial Gender and Ethnicity Identification," Advances in Biometrics, pp. 554-561 (2005), which is incorporated by reference herein in its entirety.

In an alternative embodiment, the acoustic trainer 120 may receive biometric features of the speakers manually. A person may review the profiles of the speaker or listen to the speaker, determine the speaker's biometric feature (e.g., gender, ethnicity, weight and age), and then enter the biometric feature to the acoustic trainer 120 via an input device (not shown). The biometric adaptation parameter correlator 320 may receive the voice sample 314 and the biometric feature of the speaker as identified by the person via the input device. The speaker's biometric feature as identified by the person need not be accurate as long as statistically significant correlation can be obtained from the speaker's biometric feature and the voice samples.

The feature extractor 360 also extracts environmental features 324. The environmental features 324 are correlated with reverberation of acoustic signals in the environment. To extract the environmental features 324, the feature extractor 360 may use Simultaneous Localization and Mapping (SLAM) or other computer vision algorithms to estimate the size or geometry of the room, the speaker's location and distance, and the location and distance of the microphone. An example algorithm for SLAM is described, for example, in Durrant-Whyte, H. and Bailey, T. "Simultaneous Localisation and Mapping (SLAM), Part I: The Essential Algorithms," Robotics and Automation Magazine 13: 99-1 (2006).

The biometric adaptation parameter correlator 320 determines the speaker's class based on the biometric features 362. Then the biometric adaptation parameter correlator 320 determines the relationships between the speaker's class and vocal characteristics of the speakers in the same class. From such relationships, the biometric adaptation parameter correlator 320 determines biometric adaptation parameters 326 optimized or adequate for a class of speakers.

In one embodiment, the biometric adaptation parameters 326 are vectors representing probability distributions of a warping factor for adapting audio signals or general acoustic models based on the biometric features 362. The probability distribution of warping factors may indicate, for example, the probabilities that certain warping factors are appropriate for adapting a certain speaker's audio signal given a speaker's biometric feature. The warping factor may be value a described, for example, in Puming Zhang and Alex Waibel, "Vocal Tract Length Normalization for Large Vocabulary Continuous Speech Recognition," School of Computer Science, Carnegie Mellon University, CMU-LTI-97-150 (May, 1997), which is incorporated by reference herein in its entirety.

In another embodiment, the biometric adaptation parameters 326 are values representing the most likely warping factors or average warping factors for a class of speakers with the similar biometric features. The biometric adaptation parameters 326 are stored in the adaptation parameters database 350 and then accessed by the acoustic recognizer 124.

The environment adaptation parameter correlator 320 analyzes the environmental features 324 and the audio signal 332 captured by the audio capturing module 112 to generate environment adaptation parameters 334. In one embodiment, the environment adaptation parameters 334 include Spectral Subtraction (SS) parameter λ described, for example, in Gomez, R. and Kawahara, T., "Robust Speech Recognition in Reverberant Environment by Optimizing Multi-band Spectral Subtraction," Journal of the Spoken Language Processing SIG of the Information Processing Society of Japan, SLP-75-4 (2009), which is incorporated by reference herein in its entirety. In one embodiment, the audio signal 332 includes a speaker's utterance. In another embodiment, the audio signal 332 does not include a speaker's utterance. Instead, the audio signal 332 includes acoustic elements designed to facilitate estimation of reverberation characteristics of the environment.

Although the voice samples 312, 314 are illustrated in FIG. 3 as being retrieved from the storage module 104, the voice samples 312, 314 may also be provided by the audio capturing module 112. That is, the voice samples 312, 314 and biometric features 362 corresponding to the speakers of the voice samples may be provided to the biometric adaptation parameter correlator 320. Also, instead of using the images 322 captured by the image capturing module 106 to generate biometric adaptation parameters, the biometric adaptation parameter correlator 320 may receive the speakers' profiles (e.g., height, gender, age, weight and ethnicity) pre-stored in the storage module 104.

The biometric adaptation parameters 326 and the environment adaptation parameters 334 are stored in the adaptation parameters database 350. In one embodiment, the adaptation parameter database 350 stores the relationships between the biometric adaptation parameters and the biometric features in the form of one or more biometric tables. The biometric tables indicate the mapping between biometric feature values to corresponding biometric adaptation parameter values. Similarly, the adaptation parameter database 350 stores the relationships between environmental feature values to a corresponding environment adaptation parameter values in the form of one or more environment tables. The environment tables indicate the mapping between the environmental feature values to corresponding environment adaptation parameter values.

Figure 4:
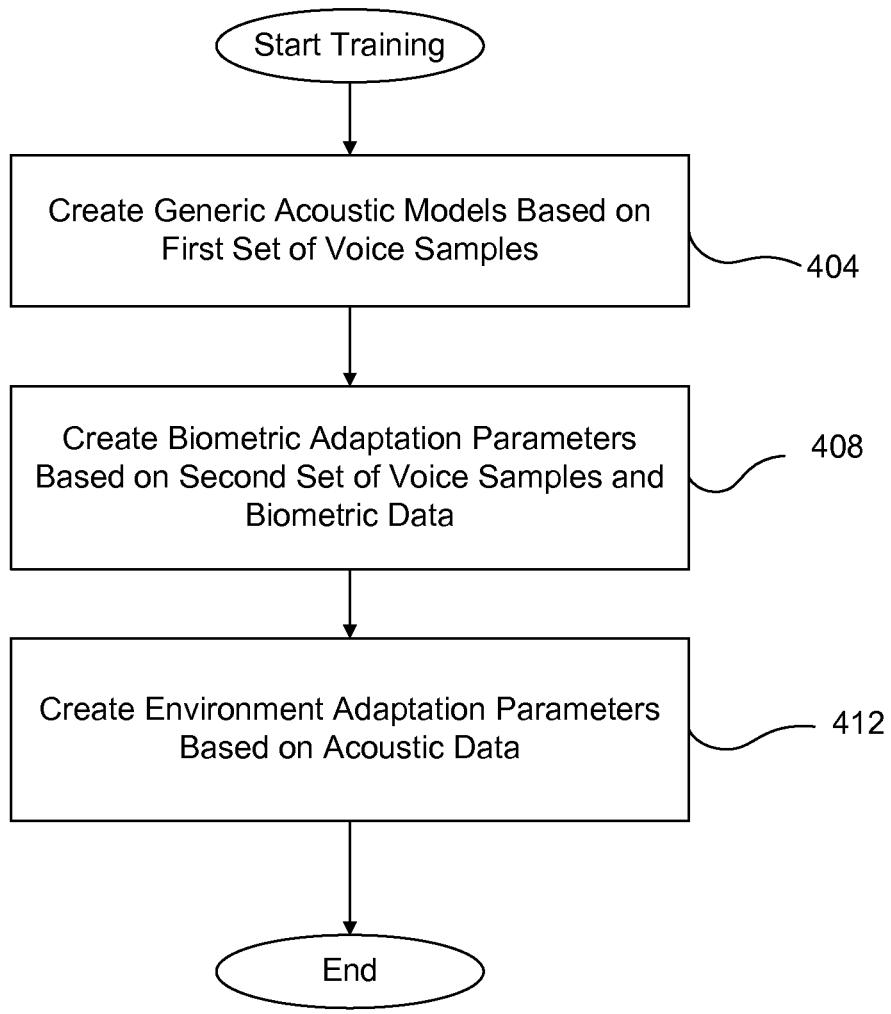
FIG. 4 is a flowchart illustrating the process of training the speech recognition device in detail, according to one embodiment of the present invention.

FIG. 4 is a flowchart illustrating the process of training the speech recognition device 100 in detail, according to one embodiment of the present invention. The generic acoustic model generator 310 creates 404 generic acoustic models 340 based on a first set 312 of voice samples and other information such as script texts corresponding to the first set 312 of voice samples. As described above with reference to FIG. 3, the voice samples and the other information may be received from the storage module 104, the image capturing module 106 or the audio capturing module 112. Speakers' profiles for the first set 312 of voice samples are not needed to generate the generic acoustic models 340.

The biometric adaptation parameter correlator 320 creates 408 the biometric adaptation parameters 326 based on a second set 314 of voice samples and the biometric features 362 of the speakers of the voice samples. In contrast to the first set of voice samples 312, speakers' biometric information for the second set 314 of voice samples is made available so that the biometric adaptation parameter correlator 320 can determine the relationships between the biometric adaptation parameter 326 and the biometric features 362.

The environment adaptation parameter correlator 330 creates 412 the environment adaptation parameters based on the environmental features 324 and the audio signal 332 captured by the audio capturing module 112. In one embodiment, the audio signal 332 includes a speaker's utterance. In another embodiment, the audio signal 332 does not include a speaker's utterances but instead includes acoustic elements (e.g., test pattern acoustic signals) designed to facilitate estimation of reverberation characteristics of the environment.

Figure 5:
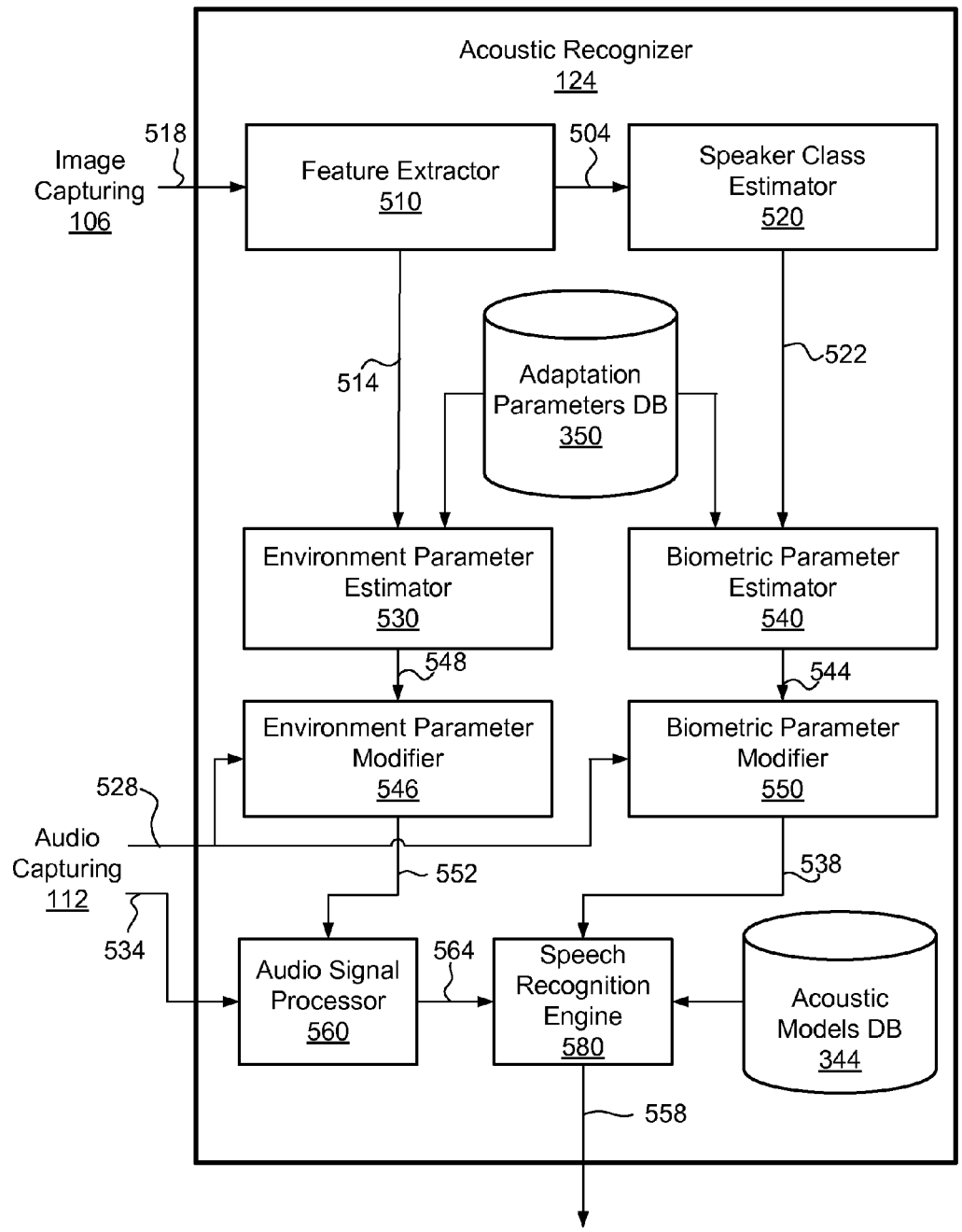
FIG. 5 is a block diagram illustrating an acoustic recognizer according to one embodiment of the present invention.

The sequence of steps in FIG. 4 is merely illustrative. For example, creating 412 the environment adaptation parameters may precede creating 404 the generic acoustic models or creating 408 the biometric adaptation parameters. Further, additional steps or processing not illustrated in FIG. 4 may be performed during training Example Acoustic Recognizer FIG. 5 is a block diagram illustrating the acoustic recognizer 124 according to one embodiment of the present invention. The acoustic recognizer 124 performs adaptations based on images 518 captured by the image capturing module 106, receives audio signals 534 and generates an output 558 representing speech elements (e.g., phonemes, words and sentences) included in the audio signals 534. The adaptation of the speech recognition is performed at the acoustic recognizer 124 based on at least two types of parameters: (i) the environment adaptation parameter, and (ii) the biometric adaptation parameters.

The acoustic recognizer 124 may include, among other components, feature extractor 510, speaker class estimator 520, environment parameter estimator 530, biometric parameter estimator 540, environment parameter modifier 546, biometric parameter modifier 550, audio signal processor 560, speech recognition engine 580, the adaptation parameters database 350 and the acoustics models database 344. The components of the acoustic recognizer 124 are merely illustrative. The acoustic recognizer 124 may include additional modules not illustrated in FIG. 5. Further, some modules may be omitted from the acoustic recognizer 124. For example, the environment parameter modifier 546 and the biometric parameter modifier 550 may be omitted if refining or modifying of adaptation parameters based on audio samples 528 is not needed.

The feature extractor 510 of the acoustic recognizer 124 performs functions similar to those of the feature extractor 360 of the acoustic trainer 120. Specifically, the feature extractor 510 extracts features from the images 518 captured by the image capturing module 106. The extracted features may include, for example, (i) biometric features 504 and (ii) environmental features 514. The biometric features 504 are similar to the biometric features 362, described above with reference to FIG. 3. The biometric features 504, for example, indicate the speaker's height. In one embodiment, the biometric adaptation parameters are estimated using, for example, techniques described in U.S. patent application Ser. No. 11/869,435, entitle "Human Pose Estimation and Tracking Using Label Assignment," filed on Oct. 9, 2007; and Xiaoguan Lu et al., "Multimodal Facial Gender and Ethnicity Identification," Advances in Biometrics, pp. 554-561 (2005), which are incorporated by reference herein in their entirety. To extract the environmental features 514, the feature extractor 510 may use Simultaneous Localization and Mapping (SLAM) or other computer vision algorithms, for example, as described in Durrant-Whyte, H. and Bailey, T., "Simultaneous Localisation and Mapping (SLAM), Part I: The Essential Algorithms," Robotics and Automation Magazine 13: 99-1 (2006).

The environment parameter estimator 530 receives the environmental features 514 and estimates the environment adaptation parameter 548 based on information stored in the adaptation parameters database 350. In one embodiment, the environment parameter estimator 530 determines the characteristics of the environment (e.g., room size, room configuration, location of the speaker and location of microphones), and then fetches a corresponding environment adaptation parameter value corresponding to the characteristics of the environment. The environment adaptation parameters may include Subtraction (SS) parameter λ described, for example, in Gomez, R. and Kawahara, T., "Robust Speech Recognition in Reverberant Environment by Optimizing Multi-band Spectral Subtraction," Journal of the Spoken Language Processing SIG of the Information Processing Society of Japan, SLP-75-4 (2009), which is incorporated by reference herein in its entirety.

The environment parameter modifier 546 receives a voice sample 528 via the audio capturing module 112 and updates the environment adaptation parameters based on the estimated environment adaptation parameters 548. Because the environment modifier 546 receives the estimated environment adaptation parameters 548, the environment parameter modifier 546 may more accurately and promptly determine accurate environment adaptation parameters 552.

The audio signal processor 560 performs dereverberation of the audio signal 534 based on the updated environment adaptation parameter 552. The audio signal processor 560 may use, for example, a method disclosed in Gomez, R. and Kawahara, T., "Robust Speech Recognition in Reverberant Environment by Optimizing Multi-band Spectral Subtraction," Journal of the Spoken Language Processing SIG of the Information Processing Society of Japan, SLP-75-4 (2009) to perform dereverberation and produce processed audio signal 564. The processed audio signal 564 is then fed to the speech recognition engine 580.

In one embodiment, the environment adaptation parameters 552 for the current environment are updated based on the voice sample 528. After updating the environment adaptation parameters 548, the audio signal processor 560 processes subsequent audio signals 534 based on the updated environment adaptation parameters 552 until an event indicating change in environment is detected.

The speaker class estimator 520 receives the biometric features 504 and determines the speaker's class. A class represents a category of speakers that are likely to share the same or similar vocal characteristics. For example, a class may include speakers of certain gender, age, height and ethnicity. The speaker class estimator 520 generates and outputs class information 522 representing the likely class of the speaker.

In one embodiment, the speaker's class is determined from a combination of biometric features such as height and ethnicity.

The biometric parameter estimator 540 receives the class information 522 and accesses the adaptation parameters database 350 to estimate the speaker's biometric adaptation parameters 544. In one embodiment, the biometric adaptation parameters 544 are vectors representing probability distributions of a warping factor for adapting audio signals or general acoustic models. The probability distribution may be represented as $P(\alpha|S)$ where $\alpha$ represents the warping factor and S represents the biometric features (e.g., height, age, weight, gender or age).

The biometric parameter modifier 550 receives the voice sample 528 via the audio capturing module 112 and updates the biometric adaptation parameters based on the estimated biometric adaptation parameters 544. Because the biometric parameter modifier 550 receives the estimated biometric adaptation parameters 544, the biometric parameter modifier 550 may more accurately and promptly determine the biometric adaptation parameters 538 for the speech recognition engine 580.

Assuming that W is the sequence of words in the voice sample 528, the biometric parameter modifier 550 computes updated warping factor $\alpha^*$ using the following equation:

$$\begin{aligned}\alpha^* &= \mathrm{argmax}(P(\alpha \mid A, W, S)) \\ &= \mathrm{argmax}(P(A \mid W, \alpha, S) \times P(\alpha \mid W, S)) \\ &= \mathrm{argmax}(P(A \mid W, \alpha) \times P(\alpha \mid S))\end{aligned} \qquad \text{equation (1)}$$

where A represents the voice sample 528, W represents the sequence of words in the voice sample, $\alpha$ represents the warping parameter along which argmax function is taken and S represents a biometric feature (e.g., height, age, weight, gender or age). For given $\alpha$ and W values, the likelihood of the voice sample is assumed independent of the biometric features S. In other words, $\alpha$ captures variations in acoustics due to S. For a given S, $\alpha$ is independent of the particular sequence of words uttered W, since it is a characteristic of the speaker and not of the linguistic content. $P(A|W, \alpha)$ can be computed from the acoustic models stored in the acoustic models database 344. $P(\alpha|S)$ is stored in the adaptation parameters database 350 and computed in the biometric parameter estimator 540.

The speech recognition engine 580 includes hardware, software, firmware or a combination thereof for performing speech recognition on the processed audio signal 564. In one embodiment, the speech recognition engine 580 may normalize the processed audio signal 564 based on the updated biometric adaptation parameters 538 by warping the processed audio signal 564.

After warping the audio signal 564, the speech recognition engine 580 executes speech recognition algorithm to extract phonemes. The speech recognition engine 580 then constructs words or sentences using, for example, X. D. Huang et al., "Spoken Language Processing: A Guide to Theory, Algorithm and System Development", Prentice Hall (2001), which is incorporated by reference herein in its entirety.

In another embodiment, the biometric adaptation parameters 538 are used to adapt the acoustic models stored in the acoustic models database 344 using, for example, using Maximum a Posteriori (MAP) Adaptation, as described in J. L. Gauvain and C. H. Lee, "Bayesian Learning of Gaussian Mixture Densities for Hidden Markov Models," Proc.

DARPA Speech and Natural Language Workshop, Palo Alto, Calif., pp. 272-277 (1991); and Maximum Likelihood Linear Regression, as described in C. J. Legetter and P. C. Woodland, "Maximum Likelihood Linear Regression for Speaker Adaptation of Continuous Density Hidden Markov Models," Computer Speech and Language, pp. 171-185 (1995), which are incorporated by reference herein in their entirety.

The speech recognition engine 558 generates and sends an output 558 that includes the recognized phonemes, words or sentences. In one embodiment, the output 558 is stored in the storage module 104. In another embodiment, the output 558 is processed further to perform certain operations (e.g., moving a robot or executing an operation on a computer).

In one embodiment, the speech recognition engine 580 uses the same biometric adaptation parameters 538 for the same speaker. New biometric adaptation parameters 538 may be generated and provided to the speech recognition engine 558 each time a new speaker is detected. The biometric adaptation parameters 538 appropriate for different speakers are fed to the speech recognition engine 580, and hence, speech recognition is adapted for different speakers.

Example Method of on-Site Adaptation

Figure 6:
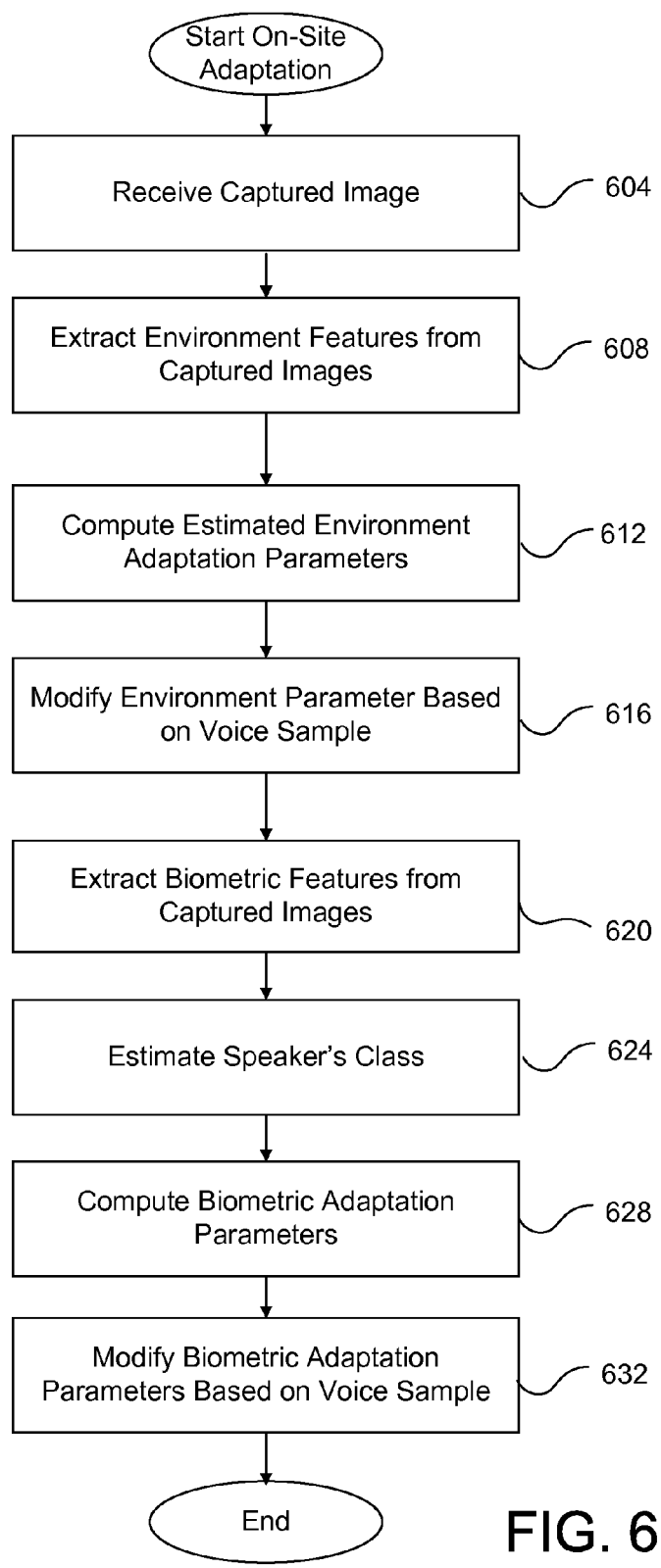
FIG. 6 is a flowchart illustrating the process of performing on-site adaptation in detail, according to one embodiment of the present invention.

FIG. 6 is a flowchart illustrating the process of performing on-site adaptation for speech recognition in detail, according to one embodiment of the present invention. First, the acoustic recognizer 124 receives 604 captured images 518 from the image capturing module 106. The feature extractor 510 then extracts the environmental features 514 from the captured images 518 using, for example, SLAM or other computer vision algorithm. The environmental features 514 may include, among others, the size or geometry of an enclosed area (e.g., room), the speaker's location and distance, and the location and distance of the microphone.

The environment parameter estimator 530 receives the environmental features 514 and computes 612 estimated environment adaptation parameters 548. In one embodiment, the environment adaptation parameter 548 generated by the environment parameter estimator 530 is modified 616 by the environment parameter modifier 546 based on the audio sample 528 collected on-site.

Before or shortly after a speaker speaks an utterance, an image of the speaker is captured and provided to the feature extractor 510. The feature extractor 510 analyzes the image of the speaker and extracts 620 the speaker's estimated biometric features 504. The speak class estimator 520 receives the biometric features 504 and estimates 624 the speaker's class (e.g., female of age 30s). The speaker class estimator 520 outputs the class information 522 to the biometric parameter estimator 540.

Based on the class information 522 and information stored in the adaptation parameters database 350, the biometric parameter estimator 540 computes 628 the biometric adaptation parameters 544.

In one embodiment, the biometric parameter modifier 550 modifies 632 the biometric adaptation parameters 544 estimated in the biometric parameter estimator 540 based on the audio sample 528 collected on-site. The modified biometric adaptation parameters 538 are then used for adaptation for the speaker, as described below in detail with reference to FIG. 7.

If another speaker starts a new session in the same environment, the process returns to receive 604 newly captured images and then proceeds to extracting 620 biometric features of the new speaker and repeats subsequent steps 624, 628 and 632 to obtain modified biometric adaptation parameters 538 for the new speaker. Steps 608 through 616 associated with obtaining the environment adaptation parameter may be skipped because the environment remains unchanged, and thus, the environment adaption parameter need not be updated. If the speech recognition device 100 is moved to a different environment or the environment is such that reverberation characteristics change, steps 604 through 616 may be repeated to obtain a new environment adaptation parameter periodically or whenever a new session starts.

The sequence of steps illustrated in FIG. 6 is merely illustrative. One or more steps may be performs in parallel or independent of other steps. For example, steps 608 through 616 may be performed in parallel with steps 620 through 632. Further, steps 608 through 616 may be performed periodically independent of steps 620 through 632. Further, the sequence of steps may be reversed or rearranged. For example, steps 620 through 632 may be performed before steps 608 through 616. One or more steps illustrated in FIG. 6 may also be omitted. For example, step 616 or step 632 may be omitted if the estimated environment adaptation parameter 548 or the estimated biometric adaptation parameters 544 are sufficiently accurate for processing the audio signals.

Example Method of Speech Recognition

The modified environment adaptation parameter 552 and the modified biometric adaptation parameters 538 are used for processing the audio signal 534 or adapting the acoustic models for speech recognition. These parameters are initially derived from images 518 captured by the image capturing module 106, and then optionally refined using the voice samples 528. These parameters are used for adapting the audio signal 534 or the acoustic models to perform accurate speech recognition, as described herein.

Figure 7:
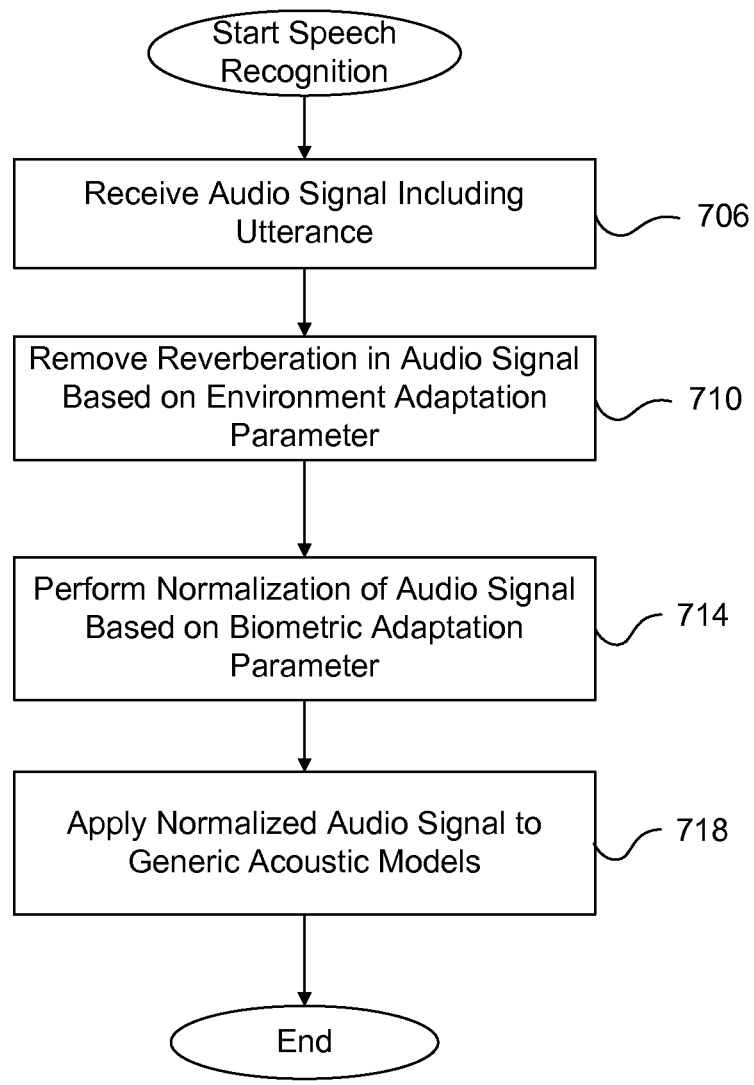
FIG. 7 is a flowchart illustrating the process of performing speech recognition in detail, according to one embodiment of the present invention.

FIG. 7 is a flowchart illustrating the process of performing speech recognition in detail, according to one embodiment of the present invention. First, the audio signal 534 including the speaker's utterance is captured at the audio capturing module 112 and received 706 at the audio signal processor 560. The audio signal processor 560 then removes 710 reverberations in the audio signal 534 based on the environment adaptation parameter 552.

In one embodiment, the speech recognition engine 580 normalizes the audio signal 564 processed by the audio signal processor 560. The normalization may include, for example, warping the audio signal 564 according to the biometric adaptation parameters 538. The audio signal 564 may be warped using a method disclosed, for example, in Puming Zhang and Alex Waibel, "Vocal Tract Length Normalization for Large Vocabulary Continuous Speech Recognition," School of Computer Science, Carnegie Mellon University, CMU-LTI-97-150 (May, 1997), which is incorporated by reference herein in its entirety.

The normalized audio signal is then processed at the speech recognition engine 580 based on the general acoustic models stored in the database 344 to generate the output 558.

Although the above embodiments are described primarily with respect to normalizing the audio signal 564, the biometric adaptation parameters may also be used for modifying or selecting general acoustic models. The modifying or selection of the acoustic models may be in addition to or an alternative to normalizing 714 the audio signal 564. For this purpose, the biometric adaptation parameters 538 may include, for example, the adaptation matrices used in Maximum Likelihood Linear Regression adaptation, as described in C. J. Legetter and P. C. Woodland, "Maximum Likelihood Linear Regression for Speaker Adaptation of Continuous Density Hidden Markov Models," Computer Speech and Language, pp. 171-185 (1995), which is incorporated by reference herein in its entirety. Specifically, the biometric parameters maybe used to estimate prior probability distributions over these adaptation matrices that can be further adapted using, for example, the Maximum a Posteriori Linear Regression framework described in C. Chesta, O. Siohan and C.-H. Lee, "Maximum A Posterior Linear Regression for Hidden Markov Model Adaptation", Proc. Eurospeech '99, pp. 211-214 (1999), which is incorporated by reference herein in its entirety.

In one embodiment, the biometric adaptation parameters 544 are estimated directly from biometric features 504 without estimating the speaker's class. For this purpose, the acoustic trainer 120 may determine the correlation between the biometric adaptation parameters and the biometric adaptation parameters directly without correlating the speaker's class and the biometric adaptation parameters. For example, the acoustic trainer 120 may establish speaker's heights with warping factor α. In the acoustic recognizer 124, the speaker's height is extracted by the feature extractor 510 and serves as a factor for determining the warping factor α.

In one embodiment, two or more biometric features may be used to estimate two or more sets of the biometric adaptation parameters. For example, the speaker's height may be used to determine a first set of biometric adaptation parameters, and the estimated gender may be used to determine a second set of biometric adaptation parameters. After the voice sample 528 is received, the biometric parameter modifier 550 modifies the two or more sets of biometric adaptation parameters in parallel, and selects one set of biometric adaptation parameters that yields more accurate result. Further refinements and modifications are then performed based on the selected set of adaptation parameters.

In one embodiment, the environment adaptation parameters and/or biometric adaptation parameters are constantly modified and adjusted as more voice samples become available. In this way, the accuracy of speech recognition for a speaker is gradually increased as the interaction with the speaker is increased.

Although the present invention has been described above with respect to several embodiments, various modifications can be made within the scope of the present invention. Accordingly, the disclosure of the present invention is intended to be illustrative, but not limiting, of the scope of the invention, which is set forth in the following claims.

What is claimed is:

1. A method of performing speech recognition, comprising:
capturing one or more images;
extracting environmental features affecting reverberation of an audio signal or noise in the audio signal from the captured one or more images, the environmental features including at least a configuration of an enclosed area in which a speaker is located, the audio signal including the speaker's utterance;
determining an environment adaptation parameter based on the extracted environment features;
performing dereverberation or noise cancellation processing on the audio signal including the speaker's utterance based on the environment adaptation parameter; and
producing speech elements by processing the processed audio signal.

2. The method of claim 1, further comprising:
extracting biometric features of the speaker from the one or more images;
determining a biometric adaptation parameter based on the extracted biometric features; and
performing adaptation based on the biometric adaptation parameter, the speech elements are produced based on the adaptation.

3. The method of claim 2, wherein the biometric adaptation parameter is a vector representing a probability distribution of a warping factor for frequency warping the processed audio signal.

4. The method of claim 2, wherein the biometric features comprise at least one of height, age, gender, weight and ethnicity of the speaker.

5. The method of claim 2, further comprising estimating a class of the speaker based on the biometric features, the biometric adaptation parameter determined based on the estimated class of the speaker.

6. The method of claim 2, further comprising:
receiving a voice sample of the speaker; and
updating the biometric adaptation parameter based on the voice sample of the speaker.

7. The method of claim 2, further comprising:
receiving training voice samples, environment information and biometric data of speakers of the training voice samples;
generating acoustic models based on the received training voice samples;
determining first correlation between values of the environment adaptation parameter and the environment information, the environment adaptation parameter determined based further on the first correlation; and
determining second correlation between values of the biometric adaptation parameter and the biometric data, the biometric adaptation parameter determined based further on the second correlation.

8. The method of claim 1, further comprising:
receiving a voice sample of the speaker; and
updating the environment adaptation parameter based on the voice sample of the speaker.

9. The method of claim 1, wherein extracting the environmental features comprises performing Simultaneous Localization and Mapping (SLAM) processing on the one or more images.

10. The method of claim 1, wherein the environment adaptation parameter comprises Spectral Subtraction (SS) parameter.

11. The method of claim 1, wherein the environmental features further comprise at least one of a size of an enclosed area where the audio signal is generated, a location of a microphone within the enclosed area for capturing the audio signal, and a location of the speaker within the enclosed area.

12. A speech recognition device, comprising:
an image capturing module configured to capture one or more images;
a feature extractor coupled to the image capturing module, the feature extractor configured to extract environmental features affecting reverberation of an audio signal or noise in the audio signal from the captured one or more images, the environmental features including at least a configuration of an enclosed area in which a speaker is located, the audio signal including a speaker's utterance;
an environment parameter estimator coupled to the feature extractor, the environment parameter estimator configured to determine an environment adaptation parameter based on the extracted environment features and determine an environment adaptation parameter based on the extracted environmental features;
an audio signal processor coupled to the environment parameter estimator, the audio signal processor configured to perform dereverberation or noise cancellation processing on the audio signal including the speaker's utterance based on the environment adaptation parameter; and a speech recognition engine coupled to the audio signal processor, the speech recognition engine configured to recognize speech elements based on the processed audio signal.

13. The device of claim 12, further comprising a biometric parameter estimator coupled to the feature extractor, the biometric parameter estimator configured to determine a biometric adaptation parameter based on biometric features extracted from the one or more images, the speech recognition engine further configured to perform adaptation based on the biometric adaptation parameter and recognize speech elements based on the adaptation.

14. The device of claim 13, wherein the biometric adaptation parameter is a vector representing a probability distribution of a warping factor for frequency warping the processed audio signal.

15. The device of claim 13, wherein the biometric features comprise at least one of height, age, gender, weight and ethnicity of the speaker.

16. The device of claim 13, further comprising a speaker class estimator configured to estimate a class of the speaker based on the biometric features, the biometric parameter estimator further configured to determine the biometric adaptation parameter based on the estimated class.

17. The device of claim 13, further comprising a biometric parameter modifier configured to update the biometric adaptation parameter based on a voice sample of the speaker.

18. The device of claim 13, further comprising an acoustic trainer configured to:
receive training voice samples, environment information and biometric data of speakers of the training voice samples;
generate acoustic models based on the received training voice samples;
determine first correlation between values of the environment adaptation parameter and the environment information, the environment parameter estimator configured to determine the environment adaptation parameter based further on the first correlation; and
determine second correlation between values of the biometric adaptation parameter and the biometric data, the biometric parameter estimator further configured to determine the biometric adaptation parameter based further on the second correlation.

19. The device of claim 12, further comprising an environment parameter modifier configured to update the environment adaptation parameter based on a voice sample of the speaker.

20. The device of claim 12, wherein the feature extractor is configured to perform Simultaneous Localization and Mapping (SLAM) processing on the one or more images.

21. The device of claim 12, wherein the environment adaptation parameter comprises Spectral Subtraction (SS) parameter.

22. The device of claim 12, wherein the environmental features further comprise at least one of a size of an enclosed area where the audio signal is generated, a location of a microphone within the enclosed area for capturing the audio signal, and a location of the speaker within the enclosed area.

23. A non-transitory computer-readable storage medium structured to store instructions executable by a processor in speech recognition device, the instructions, when executed cause the processor to:
capture one or more images;
extract environmental features affecting reverberation of an audio signal or noise in the audio signal from the captured one or more images, the environmental features including at least a configuration of an enclosed area in which a speaker is located, the audio signal including the speaker's utterance;
determine an environment adaptation parameter based on the extracted environment features;
perform dereverberation or noise cancellation processing on the audio signal including the speaker's utterance based on the environment adaptation parameter; and
recognize speech elements based on the processed audio signal.

24. The computer-readable storage medium of claim 23, further comprising instructions to:
extract biometric features of the speaker from the one or more images;
determine a biometric adaptation parameter based on the extracted biometric features; and
perform adaptation based on the biometric adaptation parameter, the recognizing of speech elements based on the adaptation.

* * * * *